(12) United States Patent
Graham et al.

(10) Patent No.: US 12,152,642 B1
(45) Date of Patent: Nov. 26, 2024

(54) FOUR WHEEL DRIVE CLUTCH IN AN ELECTRIC VEHICLE

(71) Applicant: Deere & Company, Moline, IL (US)

(72) Inventors: Brett S. Graham, Dubuque, IA (US); Steven R. Whiteman, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/463,997

(22) Filed: Sep. 8, 2023

(51) Int. Cl.
| | |
|---|---|
| *F16D 48/06* | (2006.01) |
| *B60K 1/02* | (2006.01) |
| *B60K 17/02* | (2006.01) |
| *B60K 17/04* | (2006.01) |
| *B60K 17/342* | (2006.01) |
| *B60K 17/356* | (2006.01) |

(Continued)

(52) U.S. Cl.
CPC .............. *F16D 48/066* (2013.01); *B60K 1/02* (2013.01); *B60K 17/02* (2013.01); *B60K 17/043* (2013.01); *B60K 17/342* (2013.01); *B60K 17/356* (2013.01); *E02F 3/3414* (2013.01); *E02F 9/02* (2013.01); *E02F 9/264* (2013.01); *F16D 25/06* (2013.01); *F16D 25/14* (2013.01); *F16D 2500/1026* (2013.01); *F16D 2500/10406* (2013.01); *F16D 2500/3067* (2013.01); *F16D 2500/3108* (2013.01); *F16D 2500/3115* (2013.01)

(58) Field of Classification Search
CPC ... E02F 9/207; E02F 9/264; E02F 9/02; E02F 3/3414; B60K 1/02; B60K 17/02; B60K 17/043; B60K 17/34; B60K 17/342; B60K 17/356; B60K 7/0007; F16D 48/066; F16D 25/06; F16D 25/14; F16D 2500/1026; F16D 2500/10431; F16D 2500/3067; F16D 2500/3108; F16D 2500/3115

See application file for complete search history.

(56) References Cited

U.S. PATENT DOCUMENTS

| | | | |
|---|---|---|---|
| 3,861,481 A | 1/1975 | Gillette et al. | |
| 6,491,123 B1 * | 12/2002 | Pasquini | E02F 9/2087 172/6 |

(Continued)

OTHER PUBLICATIONS

Firstgreen Industries, New Elise 900 MK3, brochure (5 pages).
Bobcat "All-Electric Compact Loaders", website download (2 pages).

*Primary Examiner* — Timothy Hannon
(74) *Attorney, Agent, or Firm* — Lucian Wayne Beavers; Patterson Intellectual Property Law, PC

(57) ABSTRACT

A construction machine includes a machine frame, left front wheel, left rear wheel, right front wheel, and right rear wheel. Left and right side electric drive motors and reduction gear assemblies are aligned with a drive axis of the left and right front wheels, respectively. Left and right side drive chains connect the left and right side electric drive motors and reduction gear assemblies with the left and right rear wheels, respectively. A left side drive clutch is positioned between the left front wheel and the left side electric drive motor and reduction gear assembly. A right side drive clutch is positioned between the right front wheel and the right side electric drive motor and reduction gear assembly. A controller is configured to selectively engage or disengage the left and right side drive clutches to selectively provide two wheel drive or four wheel drive.

19 Claims, 5 Drawing Sheets

(51) Int. Cl.
*E02F 3/34* (2006.01)
*E02F 9/02* (2006.01)
*E02F 9/26* (2006.01)
*F16D 25/06* (2006.01)
*F16D 48/02* (2006.01)

(56) References Cited

U.S. PATENT DOCUMENTS

2013/0275014 A1* 10/2013 Yang ..................... B60K 17/08
 701/52
2017/0327000 A1* 11/2017 Wada .................. B60L 15/2054
2021/0086612 A1* 3/2021 Imamura ............. B60K 17/346

* cited by examiner

FOUR WHEEL DRIVE CLUTCH IN AN ELECTRIC VEHICLE

BACKGROUND OF THE DISCLOSURE

Field of the Disclosure

The present disclosure relates to construction machines including but not limited to skid steer loaders.

Description of the Prior Art

Construction machines, such as skid steer loaders, perform a variety of operations. For example, construction machines may be operable to grade or otherwise modify the terrain or equivalent working environment in some way and may be self-propelled in nature.

While traditional skid steer loaders are powered by diesel engines, some skid steer loaders are now electrically powered. In electrically powered skid steer loaders, the diesel engines are replaced with batteries which power electric drive motors. These batteries are often large and require a significant amount of the space on or within a machine frame of the skid steer loader. Moreover, it is often desirable to use the largest battery feasible in order to provide the construction machine with greater power for a longer period of time.

The machine frame of the skid steer loader is supported from a ground-surface by left side wheels and right side wheels. Traditional skid steer loaders include a left side hydrostatic motor to drive the left side wheels and a right side hydrostatic motor to drive the right side wheels. The left side hydrostatic motor is positioned between the left side wheels and the right side hydrostatic motor is positioned between the right side wheels. Further, the left and right hydrostatic motors are coupled to a centrally located hydrostatic pump. Having the left and right hydrostatic motors and the hydrostatic pump centrally located leaves little room for other components to be placed on or within the machine frame. Thus, the drive component layout of a conventional skid steer loader may not provide sufficient space for a battery of the size desired.

Accordingly, a need exists for improvements in the layout and positioning of components of a skid steer loader when the skid steer loader is electrically powered so as to provide increased space for the batteries.

SUMMARY OF THE DISCLOSURE

This Summary of the Disclosure is provided to introduce a selection of concepts in a simplified form that are further described below in the Detailed Description. This Summary of the Disclosure is not intended to identify key features or essential features of the claimed subject matter, nor is it intended to be used to limit the scope of the claimed subject matter.

One aspect in accordance with the embodiments disclosed herein is a construction machine. In one embodiment, the construction machine may comprise a machine frame, a plurality of wheels, a work implement, left and right side electric motors, left and right side reduction gear assemblies, left and right side drive chains, and a controller. The plurality of wheels may include a left front wheel, a left rear wheel, a right front wheel, and a right rear wheel supporting the machine frame. The work implement may be carried by the machine frame. The left side electric drive motor and left side reduction gear assembly may be located along a drive axis of the left front wheel. The left side drive chain may connect the left side electric drive motor and left side reduction gear assembly with the left rear wheel. The left side drive clutch may be positioned between the left front wheel and the left side electric drive motor and left side reduction gear assembly. The right side electric drive motor and right side reduction gear assembly may be located along a drive axis of the right front wheel. The right side drive chain may connect the right side electric drive motor and right side reduction gear assembly with the rear right wheel. The right side drive clutch may be positioned between the right front wheel and the right side electric drive motor and right side reduction gear assembly. The controller may be configured to selectively engage or disengage the left and right side drive clutches to selectively provide two wheel drive or four wheel drive.

Numerous objects, features and advantages of the present invention will be readily apparent to those skilled in the art upon a review of the following description in conjunction with the accompanying drawings.

DETAILED DESCRIPTION

Figure 1:
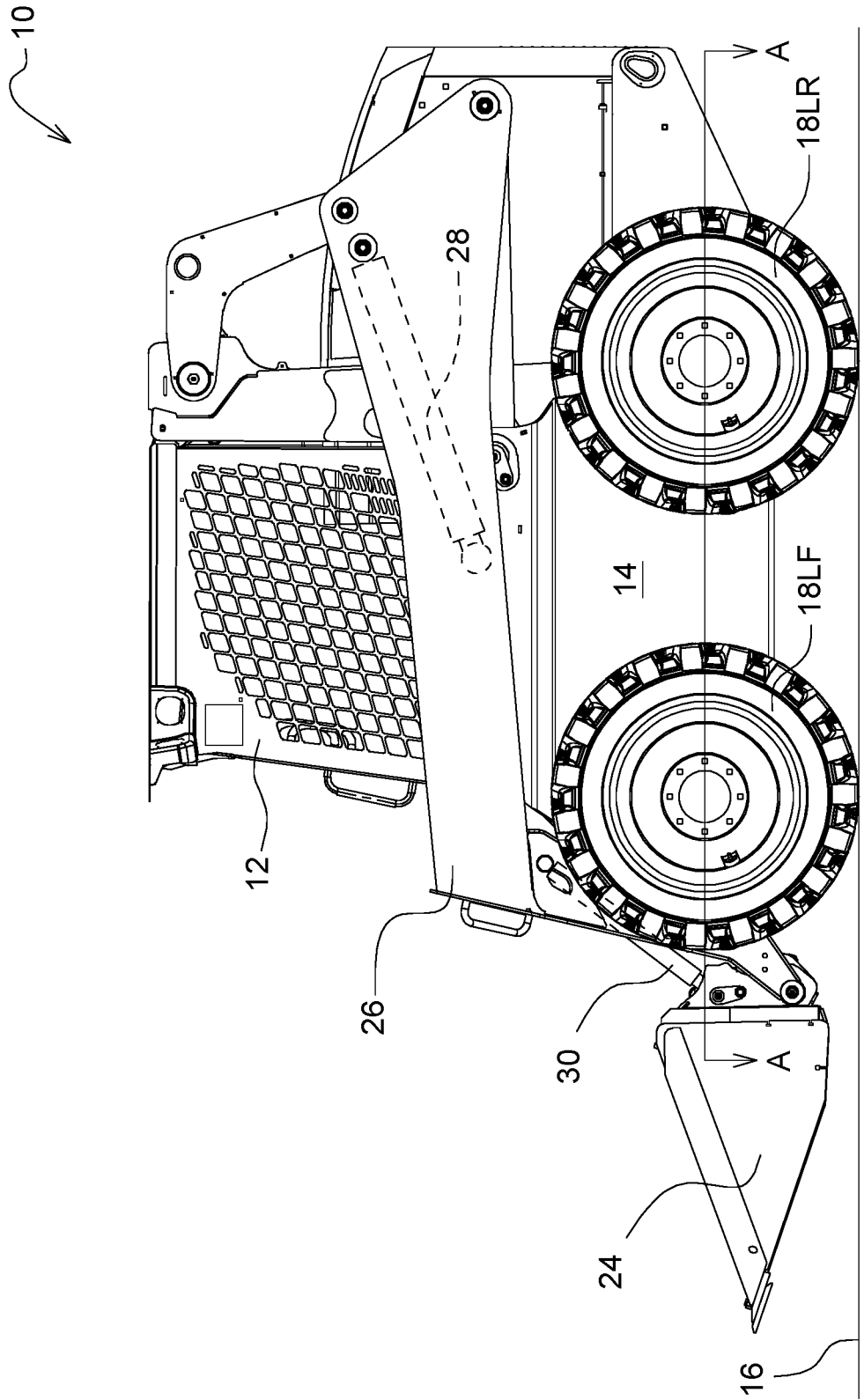
FIG. 1 is a side elevation view of a construction machine in the form of a skid steer loader.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected," "attached," "joined," "mounted," "fastened," and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof. Furthermore, any part of the apparatus of the present disclosure may be made using any applicable manufacturing method, such as, but not limited to 3D printing, injection molding, or the like.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Referring now to the drawings and particularly to FIG. 1, a construction machine in the form of a skid steer loader is shown and generally designated by the number 10. The construction machine 10 may also be referred to herein as a skid steer loader 10 or a skid steer machine 10. The construction machine 10 may also take the form of other types of loader machines. The construction machine 10 may perform a number of operations, including excavating or loading material, shaping or smoothing ground surfaces, excavating or boring holes, or breaking up material, to name a few operations.

As used herein, directions with regard to the construction machine 10 may be referred to from the perspective of an operator seated within an operator station 12 of the construction machine 10. The left of construction machine 10 is to the left of such an operator, the right of construction machine 10 is to the right of such an operator, the front or fore of construction machine 10 is the direction such an operator faces, the rear or aft of construction machine 10 is behind such an operator, the top of construction machine 10 is above such an operator, and the bottom of construction machine 10 is below such an operator.

The construction machine 10 may include a machine frame 14 which may be supported from a ground surface 16 by a plurality of ground engaging wheels 18. The operator station 12 may be supported by the machine frame 14. The plurality of ground engaging wheels 18 may provide rolling support to machine frame 14 and traction. The construction machine 10 is shown having a left front wheel 18LF, a left rear wheel 18LR, a right front wheel 18RF, and a right rear wheel 18RR. Each of the plurality of wheels 18 may be mounted to a respective axle 19. Specifically, the construction machine 10 may include a left front axle 19LF, a left rear axle 19LR, a right front axle 19RF, and a right rear axle 19RR corresponding to the left front wheel 18LF, left rear wheel 18LR, right front wheel 18RF, and right rear wheel 18RR, respectively. Rotation of each wheel 18 may correspond to rotation of a corresponding axle 19.

The construction machine 10 may include at least one battery 20, such as a lithium ion battery to name an example. The at least one battery 20 may simply be referred to herein as a battery 20. Battery 20 may provide drive power to the electric drive motors 32 further described below. The drive train arrangement disclosed herein provides a relatively large area 21 indicated in dash lines in FIG. 2, where the batteries 20 may be located. The battery 20 may also be operable to provide power to various components of the construction machine 10. The construction machine 10 may be steered as an operator manipulates controls to drive the wheels 18 on the left or right of the machine frame 14 at different speeds to thereby steer the construction machine 10 in a conventional skid steer fashion.

Machine frame 14 may provide strength and support to construction machine 10 and interconnect the components of construction machine 10. The construction machine 10 may include a work implement 24 carried by the machine frame 14. In FIG. 1, the work implement 24 is shown in the form of a bucket 24. In other optional embodiments, the bucket 24 may be replaced with other types of work implements 24, such as a snowplow 24 to name an example. A lifting linkage generally designated by the number 26 may connect the machine frame 14 and the work implement 24. The lifting linkage 26 may be operable for lifting and lowering the work implement 24 relative to the machine frame 14. The lifting linkage 26 may be a kinematic linkage including a plurality of links connected together at a plurality of pivotal joints. The work implement 24 may be selectively coupled to the lifting linkage 26 such that the type of work implement 24 coupled to the lifting linkage 26 may be selected based on desired operation.

Figure 5:
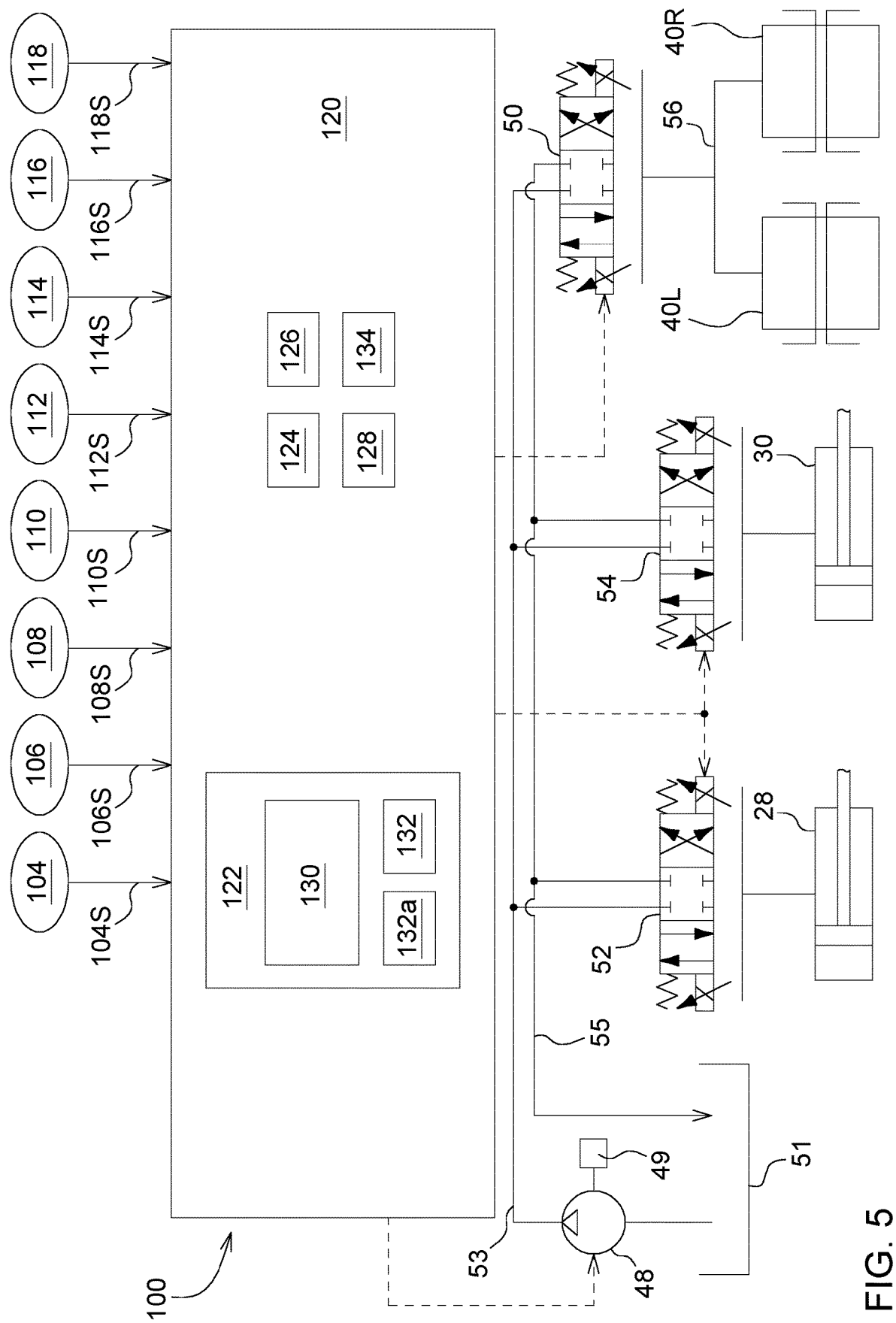
FIG. 5 is a schematic view of a control system 100 of the construction machine of FIG. 1.

One optional embodiment of the construction machine 10 may include a conventional hydraulic actuator system having a hydraulic pressure source provided by a hydraulic pump 48 (schematically shown in FIG. 5). An electric motor 49, powered by the battery 20, may drive the hydraulic pump 48. The conventional hydraulic actuator system may include a plurality of hydraulic actuators configured to selectively move certain components of the construction machine 10. The pump 48 may draw hydraulic fluid from tank 51 and provide that hydraulic fluid under pressure to the various actuators via a hydraulic fluid supply line 53. Low pressure hydraulic fluid may be returned to tank 51 via a hydraulic fluid return line 55.

In another optional embodiment of the construction machine 10 wherein the construction machine 10 is predominantly electric, the hydraulic actuators may be replaced by electric actuators. In such an embodiment, the construction machine 10 may still include the hydraulic pump 48 for driving certain hydraulic components of the construction machine 10. However, the hydraulic pump 48 of the conventional hydraulic actuator system may be replaced by a smaller unit. Thus, these predominantly electric construction machines 10 may not include a conventional hydraulic actuator system.

Movement of the lifting linkage 26 relative to the machine frame 14 may be controlled by lifting actuators 28. Movement of the work implement 24 relative to the lifting linkage 26 is controlled by one or more implement actuators 30. The one or more implement actuators 30 may also be referred to herein as one or more bucket actuators 30. Although one lifting actuator 28 and one implement actuator 30 are shown in FIG. 1, there may be two or more lifting actuators 28 and implement actuators 30.

In certain optional embodiments, such as the embodiment where the construction machine 10 has a conventional hydraulic actuator system, the lifting actuators 28 and implement actuators 30 may be hydraulic actuators, preferably hydraulic cylinders. Alternatively, the lifting actuators 28 and implement actuators 30 may be hydraulic rotary actuators such as a slew drive connected to adjacent links at a common pivotal joint. In other optional embodiments, such as the embodiment where the construction machine 10 is predominantly electric, the lifting actuators 28 and implement actuators 30 may be electrically powered linear actuators.

Figure 2:
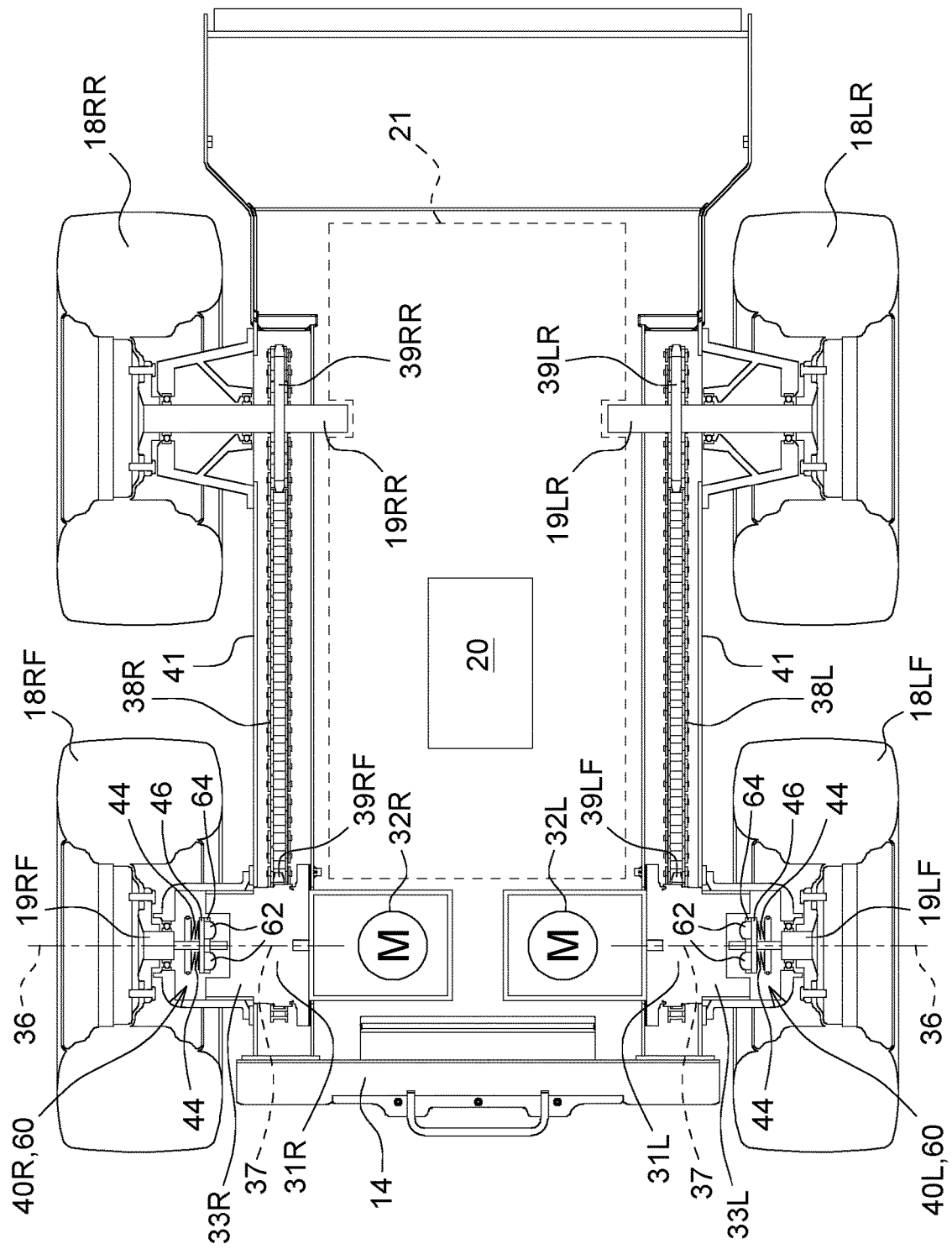
FIG. 2 is a schematic cross-sectional top view of the construction machine of FIG. 1 taken along lines A-A of FIG. 1 wherein the construction machine includes left and right drive clutches in the form of dog clutches.
Figure 3:
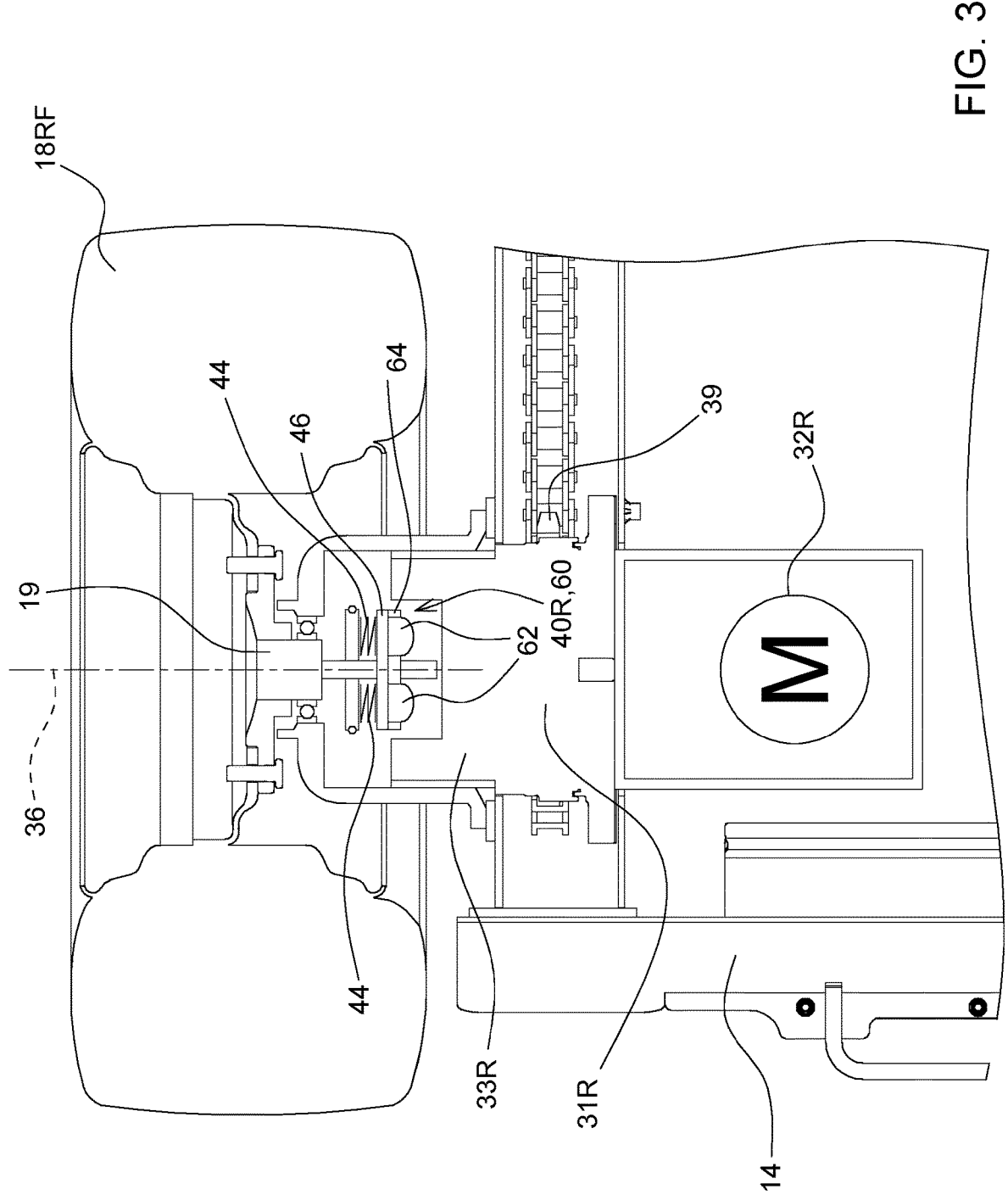
FIG. 3 is an enlarged view of the area of the right front wheel and right front drive assembly of the machine of FIG. 2.
Figure 4:
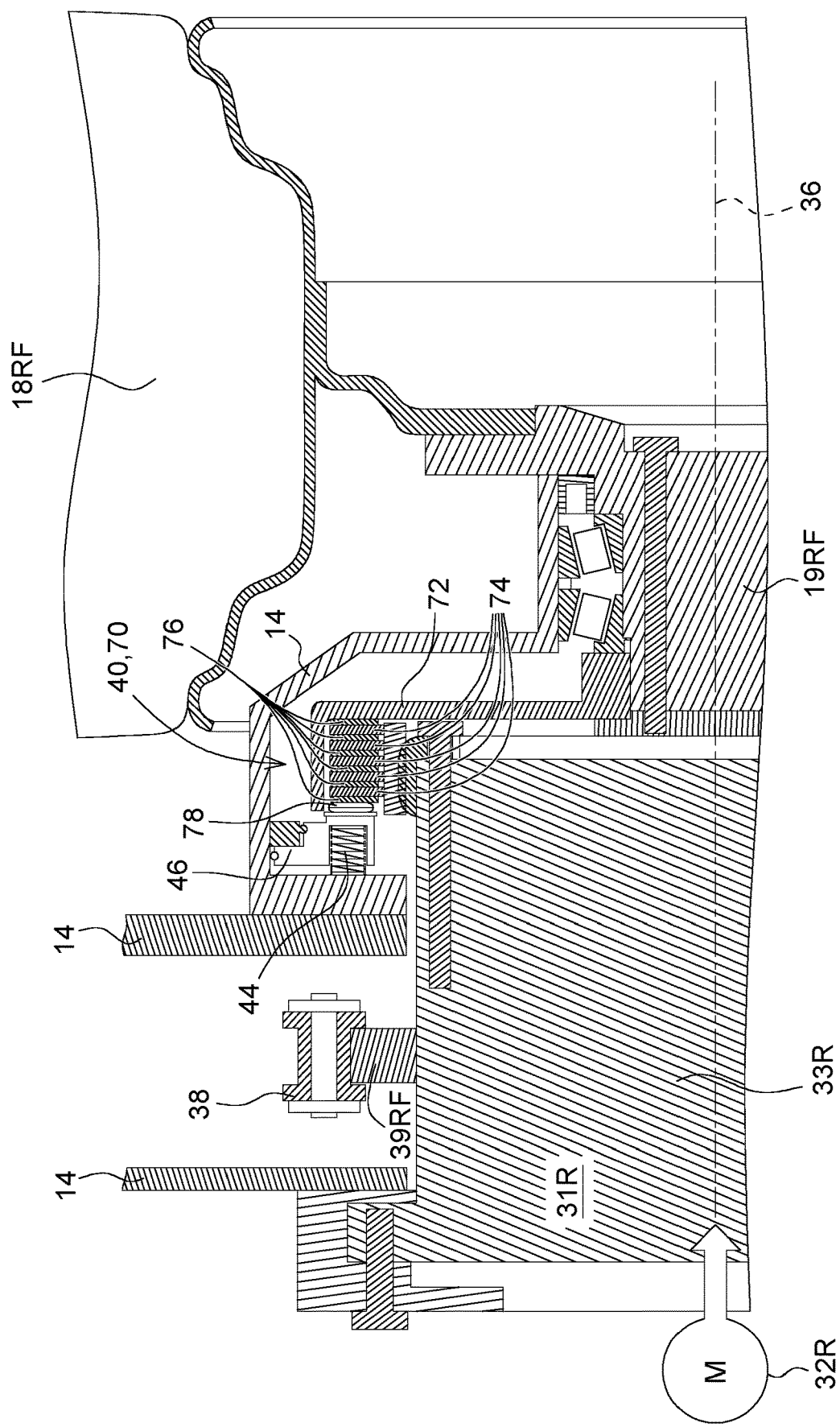
FIG. 4 is a view similar to FIG. 3 of an alternative embodiment wherein the clutch is in the form of a friction disk clutch.

Referring now to FIGS. 2-4, the construction machine 10 may include a left side electric drive motor and reduction gear assembly 31L and a right side electric drive motor and reduction gear assembly 31R. Each of the left side electric drive motor and reduction gear assembly 31L and right side electric drive motor and reduction gear assembly 31R may be generally designated by the number 31.

Each electric drive motor and reduction gear assembly 31 may include an electric drive motor 32 and a reduction gear assembly 33. Specifically, the left side electric drive motor and reduction gear assembly 31L may include a left side electric drive motor 32L and a left side reduction gear assembly 33L. The right side electric drive motor and reduction gear assembly 31R may include a right side electric drive motor 32R and a right side reduction gear assembly 33R. The electric drive motor and reduction gear assemblies 31 may be connected to the one or more batteries 20 such that the electric drive motor and reduction gear assemblies 31 may be powered or driven by the one or more batteries 20.

Each electric drive motor 32 may be operable to selectively rotate specific wheels 18 of the construction machine 10. Specifically, the left side electric drive motor and reduction gear assembly 31L may be operable to selectively rotate the left front wheel 18LF and left rear wheel 18LR. The right side electric drive motor and reduction gear assembly 31R may be operable to selectively rotate the right front wheel 18RF and right rear wheel 18RR.

Each of the left front wheel 18LF and right front wheel 18RF may have a drive axis 36 defined through an axial center of the wheel 18. The left side electric drive motor and reduction gear assembly 31L may be located along the drive axis 36 of the left front wheel 18LF. When the left side electric drive motor and reduction gear assembly 31L is described herein as located along the drive axis 36 of the left front wheel 18LF, this means that the drive axis 36 intersects some portion of the left side electric drive motor and reduction gear assembly. In a preferred embodiment the left side electric drive motor and reduction gear assembly 31L includes an assembly output axis 37 arranged co-axial with the drive axis 36 of the left front wheel 18LF.

Similarly, the right side electric drive motor and reduction gear assembly 31R may be located along the drive axis 36 of the right front wheel 18RF. And in a preferred embodiment the right side electric drive motor and reduction gear assembly 31R includes an assembly output axis 37 arranged co-axial with the drive axis 36 of the right front wheel 18RF.

The construction machine 10 may include a left side drive chain 38L and a right side drive chain 38R. The left side drive chain 38L and the right side drive chain 38R may be generally designated by the number 38. The left side drive chain 38L may connect the left side electric drive motor and reduction gear assembly 31L with the left rear wheel 18LR. The right side drive chain 38R may connect the right side electric drive motor and reduction gear assembly 31R with the right rear wheel 18RR. Each drive chain 38 may be at least partially enclosed within a respective chain case 41. Each chain case 41 may be operable to protect the respective drive chain 38 from dust, debris, and other elemental hazards. Moreover, each chain case 41 may prevent foreign objects from becoming lodged in the drive chain 38 and causing malfunctions.

Each of the axles 19 may include a sprocket 39 mounted thereto. The sprocket 39 may be a conventional sprocket having a plurality of teeth extending from a radial edge of the sprocket 39. The sprocket 39, and specifically the plurality of teeth, may be configured to engage a respective drive chain 38. The left side drive chain 38L may extend from the sprocket 39LF of the left front axle 19LF to the sprocket 39LR of the left rear axle 19LR. The right side drive chain 38R may extend from the sprocket 39RF of the right front axle 19RF to the sprocket 39RR of the right rear axle 19RR. Thus, rotation of the sprockets 39LF and 39RF of the left front axle 19LF and right front axle 19RF may be transferred to the left rear axle 19LR and right rear axle 19RR, respectively, via the drive chains 38L and 38R.

The electric drive motor and reduction gear assembly 31 may rotate the drive chain 38. Specifically, the electric drive motor and reduction gear assembly 31 may rotate the sprocket 39 of a respective front axle 19, the sprocket 39 may rotate the drive chain 38, and the drive chain 38 may rotate the sprocket 39 of a respective rear axle 19. Rotation of the sprockets 39 associated with the rear axles 19 may cause the rear axles 19 to rotate, in turn causing the rear wheels 18 to rotate. Thus, the construction machine 10 may experience full-time rear wheel drive wherein the left side electric drive motor and reduction gear assembly 31L rotates the left rear wheel 18LR, and the right side electric drive motor and reduction gear assembly 31R rotates the right rear wheel 18RR.

The construction machine 10 may include a left side drive clutch 40L and a right side drive clutch 40R. The left side drive clutch 40L and the right side drive clutch 40R may be generally designated by the number 40. The left side drive clutch 40L may be positioned between the left front wheel 18LF and the left side electric drive motor and reduction gear assembly 31L. The right side drive clutch 40R may be positioned between the right front wheel 18RF and the right side electric drive motor and reduction gear assembly 31R. Thus, the electric drive motor may be operably coupled to the reduction gear assembly 31, the reduction gear assembly 31 may be operably coupled to the drive clutch 40, and the drive clutch 40 may be operably coupled to a corresponding left or right front wheel 18LF, 18RF and axle 19.

The drive clutches 40 may be operable to selectively engage or disengage the electric drive motor and reduction gear assembly 31 to selectively provide two wheel drive or four wheel drive. In certain optional embodiments, the construction machine 10 operates in two wheel drive when the drive clutch 40 is disengaged and operates in four wheel drive when the drive clutch 40 is engaged. Thus, the drive clutch 40 may be operable in at least an engaged configuration and a disengaged configuration. The engaged and disengaged configurations may also be referred to herein as engaged and disengaged positions.

When the construction machine 10 operates in two wheel drive, the left and right electric drive motor and reduction gear assemblies 31L, 31R may only drive the left and right rear wheels 18LR, 18RR. When the construction machine 10 operates in four wheel drive, the left and right electric drive motor and reduction gear assemblies 31L, 31R may drive the left and right rear wheels 18LR, 18RR as well as the left and right front wheels 18LF, 18RF.

More specifically, in the disengaged configuration, the left drive clutch 40L does not engage the left side electric drive motor and reduction gear assembly 31L with the left front wheel 18LF. Thus, the left side electric drive motor 32L only drives the left rear wheel 18LR via at least the left side drive chain 38L and the left front wheel 18LF is not drivingly connected to the left side electric drive motor 32L. The left front wheel 18LF may rotate freely relative to the left side electric drive motor and reduction gear assembly 31L. The right drive clutch 40R does not engage the right side electric drive motor and reduction gear assembly 31R with the right front wheel 18RF. Thus, the right side electric drive motor 32R only drives the right rear wheel 18RR via at least the right side drive chain 38R and the right front wheel 18RF is not drivingly connected to the right side electric drive motor 32R. The right front wheel 18RF may rotate freely relative to the right side electric drive motor and reduction gear assembly 31R. Thus, the construction machine 10 operates in two wheel drive when the left drive clutch 40L and right drive clutch 40R are in the disengaged configuration.

In the engaged configuration, the left drive clutch 40L engages the left side electric drive motor and reduction gear assembly 31L with the left front wheel 18LF such that the left side electric drive motor 32L is drivingly connected to the left front wheel 18LF in addition to being drivingly connected to the left rear wheel 18LR via the left side drive chain 38L. The right drive clutch 40R engages the right side electric drive motor and reduction gear assembly 31R with the right front wheel 18RF such that the right side electric drive motor 32R is drivingly connected to the right front wheel 18RF in addition to being drivingly connected to the right rear wheel 18RR via the right side drive chain 38R. Thus, the construction machine 10 operates in four wheel drive when the left drive clutch 40L and the right drive clutch 40R are in the engaged configuration.

Each drive clutch 40 may be a spring applied hydraulic release clutch. A spring applied clutch is desirable to create a "fail safe" condition such that if hydraulic power is removed the clutch is spring applied and this allows for four wheel braking. Each drive clutch 40 may include one or more mechanical springs 44 configured to bias the respective drive clutch 40 to the engaged position wherein the respective electric drive motor and reduction gear assembly 31 is drivingly connected to the respective front wheel 18LF, 18RF. Each drive clutch 40 may further include one or more hydraulic pistons 46 configured to move the respective clutch 40 to the disengaged positioned wherein the respective electric drive motor and reduction gear assembly is not drivingly connected to the respective front wheel 18LF, 18RF. Thus, the one or more hydraulic pistons 46 may counteract the bias of the one or more mechanical springs 44. In certain optional embodiments of the construction machine 10, the one or more hydraulic pistons 46 may be a driven by the hydraulic pump 48 of a conventional hydraulic actuator system. In other optional embodiments of the construction machine 10 without a conventional hydraulic actuator system, the one or more hydraulic pistons may be driven by a smaller hydraulic pump 48 specially associated with the drive clutches 40. Alternatively, instead of a hydraulic release mechanism, an electromagnetic clutch may be used.

As schematically illustrated in FIG. 5, the hydraulic pump 48 may be configured to provide hydraulic fluid under pressure to at least the left and right side drive clutches 40L and 40R. A control valve 50 may be configured to selectively communicate the hydraulic fluid under pressure to the left and right side drive clutches 40. Thus, the control valve 50 may be in fluid communication with the hydraulic pump 48. The control valve 50, also referred to herein as a clutch control valve 50, may be operable to control the flow of hydraulic fluid being communicated to the one or more hydraulic pistons 46.

As seen in FIG. 5 the pump 48 may provide hydraulic fluid to the clutch control valve 50 via hydraulic fluid supply line 53. And the clutch control valve 50 may simultaneously supply hydraulic fluid to both of the clutches 40L and 40R via a common clutch supply line 56. Alternatively, separate control valves could separately provide hydraulic fluid to the clutches 40L and 40R, thus providing non-simultaneous actuation of the clutches.

As shown in FIGS. 2-3, in certain optional embodiments, each drive clutch 40 may be a dog clutch. The dog clutch may be generally designated by the number 60. The dog clutch 60 may operate by coupling two rotating components by positive engagement of one or more dogs 62 or other protrusions in corresponding recesses defined in a receiving plate 64. The one or more dogs 62 may be mounted to the hydraulic piston 46 for movement with the piston 46. The piston 46 may be biased toward the engaged position via the one or more mechanical springs 44. The one or more mechanical springs 44 may be operable to bias the one or more dogs 62 into engagement with the corresponding recesses defined in the receiving plate 64. The one or more dogs 62 may engage the corresponding recesses defined in the receiving plate 64 such that the dog clutch 60 is engaged. The hydraulic piston 46 may be moved away from the receiving plate 64 such that the one or more dogs 62 disengage the corresponding recesses defined in the receiving plate 64 and the dog clutch 60 is disengaged.

As shown in FIG. 4, in certain optional embodiments, each drive clutch 40 may be a friction disk clutch, such as a single plate clutch, a multi-plate clutch, or a cone clutch to name a few examples. The friction disk clutch may be generally designated by the number 70. The friction disk clutch 70 may operate by transferring torque from one rotating surface to another by pressing the two rotating surfaces against each other such that a frictional force is created between the two surfaces. The friction disk clutch 70 may be engaged to transfer rotational motion from the right side reduction gear assembly 33R to an axle hub 72 attached to right front axle 19RF. The friction disk clutch includes a plurality of clutch plates 74 that rotate with the reduction gear assembly 33R, and a plurality of friction disks 76 splined to the axle hub 72. The friction disks 76 are sandwiched between the clutch plates 74. The mechanical springs 44 bias the piston 46 against the stacked clutch plates 74 and friction disks 76 to force them together so that the right front wheel 18RF is driven by the right side reduction gear assembly 33R. A sliding rotating interface 78 is provided between piston 46 and the stacked plates. To release or disengage the friction disk clutch 40R, 70, hydraulic pressure is applied to piston 46 to move the piston 46 from right to left as seen in FIG. 4.

As schematically illustrated in FIG. 5, the construction machine 10 may include a control system 100 including a controller 120. The controller 120 may be part of the machine control system of the construction machine 10, or it may be a separate control module. The controller 120 may for example be mounted in a control panel 122 located at the operator station 12.

The controller 120 may generate control signals for controlling the operation of the various actuators discussed herein, which control signals are indicated schematically in FIG. 5 by dashed lines connecting the controller 120 to graphic depictions of the various actuators with the arrow indicating the flow of the command signal from the controller 120 to the respective actuators. It will be understood that for control of a hydraulic cylinder type actuator, the controller 120 may send an electrical signal to an electro/mechanical control valve such as a lifting actuator control valve 52 and an implement actuator control valve 54 which control flow of hydraulic fluid to and from the respective hydraulic cylinder. The lifting actuator 28 and the one or more implement actuators 30 are schematically illustrated in FIG. 5. Lifting actuator 28 is connected to lifting actuator control valve 52 and the one or more implement actuators 30 are connected to implement actuator control valve 54. It will be understood that the controller 120 may control other actuators or components of construction machine 10.

Controller 120 includes or may be associated with a processor 124, a computer readable medium 126, a database 128, and an input/output module or control panel 122 having a display 130. An input/output device 132, such as a keyboard, joystick, or other user interface, is provided so that the human operator may input instructions to the controller 120. It is understood that the controller 120 described herein may be a single controller having all of the described functionality, or it may include multiple controllers wherein the described functionality is distributed among the multiple controllers.

Various operations, steps or algorithms as described in connection with the controller 120 can be embodied directly in hardware, in a computer program product 134 such as a software module executed by the processor 124, or in a combination of the two. The computer program product 134 can reside in RAM memory, flash memory, ROM memory, EPROM memory, EEPROM memory, registers, hard disk, a removable disk, or any other form of computer-readable medium 126 known in the art. An exemplary computer-readable medium 126 can be coupled to the processor 124 such that the processor 124 can read information from, and write information to, the memory/storage medium. In the alternative, the medium can be integral to the processor 124. The processor 124 and the computer-readable medium 126 can reside in an application specific integrated circuit (ASIC). The ASIC can reside in a user terminal. In the alternative, the processor 124 and the computer-readable medium 126 can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor 124 can also be implemented as a combination of computing devices, e.g., a combination of a DSP and a microprocessor, a plurality of microprocessors, one or more microprocessors in conjunction with a DSP core, or any other such configuration.

Referring now to TABLE 1, a plurality of exemplary drive clutch 40 engagement scenarios of the construction machine 10 are shown. One of skill in the art will appreciate that other drive clutch 40 engagement scenarios are possible and within the spirit and scope of the present disclosure.

TABLE 1

| Mode | Vehicle Condition | Clutch State | Comment | Sensor |
|---|---|---|---|---|
| 1 | None | Engaged | Failsafe Four (4) Wheel Braking | None |
| 2 | Operator Requests Two (2) Wheel Drive | Disengaged | Reduce Drag From Front Axle | Switch |
| 3 | Operator Requests Four (4) Wheel Drive | Engaged | Improve Tractive Effort | Switch |
| 4 | High Travel Speed of Construction Machine | Disengaged | Reduce Drag From Front Axle | Vehicle Speed Sensor |
| 5 | Work State Signal Corresponds to a Working Activity | Engaged | Improve Tractive Effort | Work Implement Operation Sensor (Hydraulic Pressures and/or Electric Currents May be Monitored) |
| 6 | Steering Input by a Human Operator; Travel Speed of Construction Machine | Disengaged | Reduce Drag From Front Axle | Steering Input Device; Vehicle Speed Sensor (Hydraulic Pressures and/or Electric Currents May be Monitored) |
| 7 | Work State Signal Corresponds to a Working Activity; Steering Input by a Human Operator | Engaged | Improve Tractive Effort | Work Implement Operation Sensor; Steering Input Device (Hydraulic Pressures and/or Electric Currents May be Monitored) |
| 8 | Parking Brake Application | Engaged | Provide Four (4) Wheel Braking | Parking Brake Input Device |
| 9 | Motor Speed Control Input (Regenerative Braking) | Engaged | Provide Four (4) Wheel Braking | Motor Speed Control Input Device |
| 10 | Deviation of Inclination of the Machine Frame From Horizontal | Engaged | Improve Tractive Effort | Level Sensor |
| 11 | Wheel Slippage | Engaged | Improve Tractive Effort | Wheel Speed Sensor |
| 12 | Installation of Specific Type of Work Implement (e.g., Snow Removal Equipment) | Engaged | Improve Tractive Effort | Work Implement Recognition Sensor |

In a first mode of operation, the default condition of the drive clutches 40 may be an engaged position. The failsafe position of the clutches 40 is the engaged position, because if there is no hydraulic pressure applied to the pistons 46, the clutches 40 are moved to the engaged position by the mechanical springs 44. One advantage of this feature may be that the construction machine 10 defaults to four wheel drive providing maximum traction as a failsafe.

In certain optional embodiments, a switch 132a located within the operator station 12 may be operable to engage or disengage the drive clutches 40. The switch 132a may be a part of the input/output device 132 of control system 100. Thus, an operator may modify the position of the drive clutches 40 based on a desired operation. In a second mode of operation, the operator may request two wheel drive by positioning the switch 132a such that the drive clutches 40 move to a disengaged position. Two wheel drive may be selected in order to reduce drag on the front axles and thus improve operating efficiency when four wheel drive is not needed.

In a third mode of operation, the operator may request four wheel drive by positioning the switch 132a such that the drive clutches 40 move to an engaged position. Four wheel drive may be selected to improve traction of the machine both for driving and braking the machine.

In certain optional embodiments, the controller 120 may be configured to automatically engage or disengage the left side drive clutch 40L and right side drive clutch 40R to selectively provide two wheel drive or four wheel drive. The controller 120 may selectively engage or disengage the drive clutches 40 at least in response to signals transmitted from the various sensors or in response to operator input. It will be understood that when the controller 120 "engages" the clutches 40 it may do so by removing hydraulic pressure from the pistons 46 so that the mechanical springs 44 may move the clutches to their failsafe engaged positions. It will be understood that when the controller 120 "disengages" the clutches 40 it may do so by applying hydraulic pressure to the pistons 46 via the clutch control valve 50.

In certain optional embodiments, the construction machine 10 may include a vehicle speed sensor 104. The vehicle speed sensor 104 may be configured to generate a vehicle speed signal 104S corresponding to a travel speed of the construction machine 10. The vehicle speed sensor 104 may generate a vehicle speed signal 104S based on a rotation speed of the wheels 18. In a fourth mode, the controller 120 may be configured to receive the vehicle speed signal 104S and to automatically disengage the left side drive clutch 40L and right side drive clutch 40R so as to provide two wheel drive when the travel speed of the construction machine 10 exceeds a set value. Disengaging the drive clutch 40 may reduce drag on the front axles 19 to which the left and right front wheels 18LF, 18RF are mounted. Thus, one advantage of this feature may be improved efficiency of the construction machine 10 resulting from reduced drag on at least the front axles 19. This feature may be useful when the construction machine 10 is moving to and from a work location.

In certain optional embodiments, the construction machine 10 may include a work implement operation sensor 106. The work implement operation sensor 106 may be configured to generate a work state signal 106S corresponding to a work state of the work implement 24. The operation sensor 106 may monitor a working activity of the work implement 24 by monitoring, in embodiments of the construction machine 10 having hydraulic actuators, hydraulic pressures of the lifting actuators 28, implement actuators 30, or other actuators related to actuation of the work implement 24. The operation sensor 106 may monitor the working activity of the work implement 24 by monitoring, in embodiments of the construction machine 10 having electric actuators, electric currents associated with the lifting actuators 28, implement actuators 30, or other actuators related to actuation of the work implement 24. In a fifth mode, the controller 120 may be configured to receive the work state signal 106S and to automatically engage the left side drive clutch 40L and right side drive clutch 40R so as to provide four wheel drive when the work state signal 106S corresponds to the working activity of the work implement 24. Four wheel drive may improve traction of the construction machine 10, and specifically the wheels 18, relative to the ground surface 16. Improved traction may be desired when the construction machine 10 is performing various operations with the work implement 24.

The construction machine 10 may include a steering input device 108, such as one or more joysticks to name an example. The steering input device 108 may be configured to generate a steering command signal 108S in response to a steering input by a human operator. In a sixth mode, the controller 120 may be configured to receive the vehicle speed signal 104S from the vehicle speed sensor 104 and/or the steering command signal 108S from the steering input device 108, and to disengage the left side drive clutch 40L and right side drive clutch 40R so as to automatically provide two wheel drive when the construction machine 10 is being steered during travel of the construction machine 10. The steering command sensor 108 may also monitor hydraulic pressures or electric currents related to steering the construction machine 10. Disengaging the left side drive clutch 40L and right side drive clutch 40R may reduce drag on the left front axle 19LF and right front axle 19RF, respectively. Thus, one advantage of this feature may be improved efficiency of the construction machine 10 resulting from reduced drag on at least the front axles 19. This feature may be useful when the construction machine 10 is moving to and from a work location.

In a seventh mode, the controller 120 may be configured to receive the work state signal 106S from the work implement operation sensor 106 and/or the steering command signal 108S from the steering input device 108, and to automatically engage the left side drive clutch 40L and right side drive clutch 40R so as to provide four wheel drive when the construction machine 10 is being steered during a working activity of the work implement 24. The operation sensor 106 may monitor the working activity of the work implement 24 by monitoring hydraulic pressures or electric currents associated with the lifting actuators 28, implement actuators 30, or other actuators related to actuation of the work implement 24. The steering command sensor 108 may monitor hydraulic pressures or electric currents related to steering the construction machine 10. Four wheel drive may improve traction of the construction machine 10, and specifically the wheels 18, relative to the ground surface 16. Improved traction may be desired when the construction machine 10 is performing various operations with the work implement 24.

In certain optional embodiments, the construction machine 10 may include a parking brake input device 110 configured to generate a parking brake command signal 110S in response to a parking brake application input by a human operator. In an eighth mode, the controller 120 may be configured to receive the parking brake command signal 110S from the parking brake input device 110 and to automatically engage the left side drive clutch 40L and right side drive clutch 40R so as to provide four wheel engagement of the parking brake input device 110. Four wheel engagement of the parking brake input device 110 may improve traction of the construction machine 10, and specifically the wheels 18, relative to the ground surface 16. Improved traction may be desired when the parking brake input device 110 is engaged such that the construction machine 10 may resist movement relative to the ground surface 16.

In certain optional embodiments, the construction machine 10 may include a motor speed control input device 112, such as a throttle, configured to generate a motor speed control signal 112S in response to a motor speed control input by a human operator. In a ninth mode, the controller

120 may be configured to receive the motor speed control signal 112S and to automatically engage the left side drive clutch 40L and right side drive clutch 40R so as to provide four wheel regenerative braking in response to a motor speed control input directing the construction machine 10 to slow down. Four wheel braking may provide improved movement resistance relative to two wheel braking. Kinetic energy from the four wheel braking may be converted into electrical power to be used or stored by the construction machine 10, and specifically the battery 20.

In certain optional embodiments, the construction machine 10 may include a level sensor 114 configured to generate a level signal 114S indicative of an inclination of the machine frame 14 relative to gravity. In a tenth mode, the controller 120 may be configured to receive the level signal 114S and to automatically engage the left side drive clutch 40L and right side drive clutch 40R so as to provide four wheel drive in response to a deviation of inclination of the machine frame 14 from horizontal in excess of a set value. Four wheel engagement may improve traction and stability of the construction machine 10, and specifically the wheels 18, relative to the ground surface 16. Improved traction and stability may be desired when the machine frame 14 deviates from horizontal, such as when the construction machine is climbing up or descending down an inclined ground surface 16.

The construction machine 10 may include a plurality of wheel speed sensors 116. Each of the wheel speed sensors 116 may be associated with a respective one of the wheels 18 such that each of the left front wheel 18LF, left rear wheel 18LR, right front wheel 18RF, right rear wheel 18RR have a corresponding wheel speed sensor 116. Each of the wheel speed sensors 116 may be configured to generate a wheel speed signal 116S corresponding to a wheel speed of a respective wheel. In an eleventh mode, the controller 120 may be configured to receive the wheel speed signals 116S and to automatically engage the left side drive clutch 40L and right side drive clutch 40R so as to provide four wheel drive when the controller 120 detects one or more of the wheel speeds exceeding the other wheel speeds by more than a set value so as to indicate a wheel slippage due to low traction of the one or more wheels having excessive wheel speed. When the construction machine 10 is operating in two wheel drive, the construction machine 10, and specifically the rear wheels 18, may experience low traction. Low traction may occur, for example, when the construction machine 10 is positioned on a severe incline or when the ground surface 16 is slick. In one exemplary scenario, a single wheel 18, such as the left rear wheel 18LR, may experience wheel slippage and the controller 120 may then detect the wheel speed of the left rear wheel 18LR exceeds the other wheel speeds by more than a set value so as to indicate wheel slippage. In another exemplary scenario, both rear wheels 18LR, 18RR may experience wheel slippage as the operator attempts to propel the construction machine 10 in a forward or rearward direction and the controller 120 may then detect that the wheel speed of the left and right rear wheels 18LR, 18RR exceeds the wheel speeds of the left and right front wheels 18LF, 18RF by more than a set value so as to indicate wheel slippage.

In certain optional embodiments, the construction machine 10 may include a work implement recognition sensor 118. The work implement recognition sensor 118 may be configured to generate a work implement identification signal 118S corresponding to installation of a specific type of work implement 24. In certain optional embodiments, the work implement recognition sensor 118 may identify which work implement 24 is installed by reading a unique radio-frequency identification (RFID) tag associated with each work implement 24. In other optional embodiments, the work implement 24, when installed, may be coupled to a switch of the construction machine 10 in a unique way that indicates the type of work implement 24 installed. In other optional embodiments, the work implement 24 may generate an electrical signal received by the construction machine 10 indicating the type of work implement 24 installed. In a twelfth mode, the controller 120 may be configured to receive the work implement identification signal 118S and to automatically engage the left side drive clutch 40L and right side drive clutch 40R so as to provide four wheel drive when the work implement identification signal 118S corresponds to the work implement 24 being the specific type of work implement 24. For example, the controller 120 may be configured to engage the left side drive clutch 40L and right side drive clutch 40R so as to provide four wheel drive when the work implement identification signal 118S corresponds a work implement 24 that may benefit from addition wheel 18 traction. One such work implement 24 may be a snowplow operable to push large amounts of snow and ice across the ground surface 16 when the ground surface 16 may be slippery.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A construction machine, comprising:
    a machine frame;
    a left front wheel, a left rear wheel, a right front wheel, and a right rear wheel supporting the machine frame;
    a work implement carried by the machine frame;
    a left side electric drive motor and reduction gear assembly located along a drive axis of the left front wheel;
    a left side drive chain connecting the left side electric drive motor and reduction gear assembly with the left rear wheel;
    a left side drive clutch between the left front wheel and the left side electric drive motor and reduction gear assembly;
    a right side electric drive motor and reduction gear assembly located along with a drive axis of the right front wheel;
    a right side drive chain connecting the right side electric drive motor and reduction gear assembly with the right rear wheel;
    a right side drive clutch between right front wheel and the right side electric drive motor and reduction gear assembly; and
    a controller configured to selectively engage or disengage the left and right side drive clutches to selectively provide two wheel drive or four wheel drive.

2. The construction machine of claim 1, wherein:
    the left side electric drive motor and reduction gear assembly includes an assembly output axis arranged co-axial with the drive axis of the left front wheel.

3. The construction machine of claim 1, wherein:
the right side electric drive motor and reduction gear assembly includes an assembly output axis arranged co-axial with the drive axis of the right front wheel.

4. The construction machine of claim 1, wherein:
the controller is configured to selectively engage or disengage the left and right side drive clutches simultaneously.

5. The construction machine of claim 1, wherein:
the left and right side drive clutches are friction disc clutches.

6. The construction machine of claim 1, wherein:
the left and right side drive clutches are dog clutches.

7. The construction machine of claim 1, wherein:
the left and right side drive clutches are spring applied hydraulic release clutches.

8. The construction machine of claim 1, wherein each of the left and right side drive clutches includes:
one or more mechanical springs configured to bias the respective clutch to an engaged position wherein the respective drive motor and reduction gear assembly is drivingly connected to the respective front wheel; and
one or more hydraulic pistons configured to move the respective clutch to a disengaged position.

9. The construction machine of claim 8, further comprising:
an electrically powered hydraulic pump configured to provide hydraulic fluid under pressure to the clutches; and
a control valve configured to selectively communicate the hydraulic fluid under pressure to the clutches.

10. The construction machine of claim 1, further comprising:
a vehicle speed sensor configured to generate a vehicle speed signal corresponding to a travel speed of the construction machine; and
wherein the controller is configured to receive the vehicle speed signal and to disengage the clutches so as to provide two wheel drive when the travel speed exceeds a set value.

11. The construction machine of claim 1, further comprising:
a work implement operation sensor configured to generate a work state signal corresponding to a work state of the work implement; and
wherein the controller is configured to receive the work state signal and to engage the clutches so as to provide four wheel drive when the work state signal corresponds to a working activity of the work implement.

12. The construction machine of claim 1, further comprising:
a vehicle speed sensor configured to generate a vehicle speed signal corresponding to a travel speed of the construction machine;
a steering input device configured to generate a steering command signal in response to a steering input by a human operator; and
wherein the controller is configured to receive the vehicle speed signal and the steering command signal, and to disengage the clutches so as to provide two wheel drive when the construction machine is being steered during travel of the construction machine.

13. The construction machine of claim 1, further comprising:
a work implement operation sensor configured to generate a work state signal corresponding to a work state of the work implement;
a steering input device configured to generate a steering command signal in response to a steering input by a human operator; and
wherein the controller is configured to receive the work state signal and the steering command signal, and to engage the clutches so as to provide four wheel drive when the construction machine is being steered during a working activity of the work implement.

14. The construction machine of claim 1, further comprising:
a parking brake input device configured to generate a parking brake command signal to a parking brake in response to a parking brake application input by a human operator; and
wherein the controller is configured to receive the parking brake command signal and to engage the clutches so as to provide four wheel engagement of the parking brake input device.

15. The construction machine of claim 1, further comprising:
a motor speed control input device configured to generate a motor speed control signal in response to a motor speed control input by a human operator; and
wherein the controller is configured to receive the motor speed control signal and to engage the clutches so as to provide four wheel regenerative braking in response to a motor speed control input directing the construction machine to slow down.

16. The construction machine of claim 1, further comprising:
a level sensor configured to generate a level signal indicative of an inclination of the machine frame relative to gravity; and
wherein the controller is configured to receive the level signal and to engage the clutches so as to provide four wheel drive in response to a deviation of inclination of the machine frame from horizontal in excess of a set value.

17. The construction machine of claim 1, further comprising:
a plurality of wheel speed sensors, one of the wheel speed sensors being associated with each of the wheels and configured to generate a wheel speed signal corresponding to a wheel speed of its respective wheel; and
wherein the controller is configured to receive the wheel speed signals and to engage the clutches so as to provide four wheel drive when the controller detects one or more of the wheel speeds exceeding the other wheel speeds by more than a set value so as to indicate a wheel slippage due to low traction of the one or more wheels having excessive wheel speed.

18. The construction machine of claim 1, further comprising:
a work implement recognition sensor configured to generate a work implement identification signal corresponding to installation of a specific type of work implement; and
wherein the controller is configured to receive the work implement identification signal and to engage the clutches so as to provide four wheel drive when the work implement identification signal corresponds to the work implement being the specific type of work implement.

19. The construction machine of claim 1, wherein the construction machine is a skid steer machine.

* * * * *